(12) United States Patent
Horlacher

(10) Patent No.: US 12,168,754 B2
(45) Date of Patent: Dec. 17, 2024

(54) SYSTEMS AND METHODS FOR TREATING PYROLYSIS OIL

(71) Applicant: CHEVRON PHILLIPS CHEMICAL COMPANY LP, The Woodlands, TX (US)

(72) Inventor: Steven R. Horlacher, League City, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 374 days.

(21) Appl. No.: 17/655,051

(22) Filed: Mar. 16, 2022

(65) Prior Publication Data

US 2023/0295524 A1  Sep. 21, 2023

(51) Int. Cl.
| | | |
|---|---|---|
| *C10G 67/00* | (2006.01) | |
| *B01D 3/00* | (2006.01) | |
| *B01D 3/32* | (2006.01) | |
| *C10G 7/12* | (2006.01) | |
| *C10G 45/00* | (2006.01) | |

(Continued)

(52) U.S. Cl.
CPC ............. *C10G 67/00* (2013.01); *B01D 3/009* (2013.01); *B01D 3/32* (2013.01); *C10G 7/12* (2013.01); *C10G 45/00* (2013.01); *C10G 47/16* (2013.01); *C10G 49/002* (2013.01); *C10G 2300/301* (2013.01); *C10G 2300/4006* (2013.01); *C10G 2300/4012* (2013.01); *C10G 2400/02* (2013.01); *C10G 2400/26* (2013.01)

(58) Field of Classification Search
CPC .......... C10G 67/00; C10G 7/12; C10G 45/00; C10G 47/16; C10G 49/002; C10G 2300/301; C10G 2300/4006; C10G 2300/4012; C10G 2400/02; C10G 2400/26; B01D 3/009; B01D 3/32; B01D 1/28; B01D 3/007; B01D 3/143; B01D 3/322; B01D 3/324; B01D 5/0063; B01D 5/009

See application file for complete search history.

(56) References Cited

U.S. PATENT DOCUMENTS

| | | |
|---|---|---|
| 5,431,888 A | 7/1995 | Hickey |
| 5,679,241 A | 10/1997 | Stanley |

(Continued)

*Primary Examiner* — Randy Boyer
*Assistant Examiner* — Juan C Valencia
(74) *Attorney, Agent, or Firm* — Eversheds Sutherland (US) LLP

(57) ABSTRACT

A pyrolysis oil fractionation system for treating a pyrolysis oil feed includes a fractionation column, at least one treatment catalyst bed, and a plurality of distillation trays. The system further includes a condenser to receive a light fraction and produce a condensed gasoline product and a vapor, a receiver coupled to the condenser, a knockout drum, and a distillate stripper coupled to the fractionation column. A method for treating a pyrolysis oil feed includes, in a fractionating column, dehydrohalogenating, decontaminating, and/or dehydrating a pyrolysis oil feed in at least one treatment catalyst bed, and distilling the treated pyrolysis oil feed into a light fraction, a middle fraction, a heavy fraction, and a bottom fraction. The method further includes condensing the light fraction and producing a condensed gasoline product and a vapor, separating a fuel gas product from the vapor, and stripping the middle fraction to produce a distillate product.

39 Claims, 3 Drawing Sheets

(51) Int. Cl.
*C10G 47/16* (2006.01)
*C10G 49/00* (2006.01)

(56) References Cited

U.S. PATENT DOCUMENTS

| | | |
|---|---|---|
| 5,792,891 A | 8/1998 | Adams |
| 5,925,799 A | 7/1999 | Stanley |
| 6,100,435 A | 8/2000 | Silverberg |
| 6,169,218 B1 | 1/2001 | Hearn |
| 6,407,300 B2 | 6/2002 | Maraschino |
| 6,441,263 B1 | 8/2002 | O'Rear |
| 6,495,732 B1 | 12/2002 | Hearn |
| 6,759,562 B2 | 7/2004 | Gartside |
| 6,777,582 B2 | 8/2004 | Gartside |
| 7,045,669 B2 | 5/2006 | Sumner |
| 7,355,087 B2 | 4/2008 | Cano |
| 9,242,908 B2 | 1/2016 | Choi |
| 9,260,357 B2 | 2/2016 | Yarrison |
| 9,611,193 B2 | 4/2017 | Choi |
| 9,920,262 B1 | 3/2018 | Wistrom |
| 10,035,125 B2 | 7/2018 | Xu |
| 10,227,538 B2 | 3/2019 | Gaffney |
| 10,252,240 B2 | 4/2019 | Xu |
| 10,543,475 B2 | 1/2020 | Xu |
| 10,814,301 B2 | 10/2020 | Xu |
| 10,814,302 B2 | 10/2020 | Yongqiang |
| 10,851,309 B2 | 12/2020 | Ramamurthy |
| 2011/0240518 A1* | 10/2011 | Podrebarac .......... B01D 61/362 208/59 |
| 2017/0283711 A1* | 10/2017 | Chen .................... B01D 3/06 |
| 2021/0031164 A1 | 2/2021 | Yongqiang |

\* cited by examiner

SYSTEMS AND METHODS FOR TREATING PYROLYSIS OIL

CROSS REFERENCE TO RELATED APPLICATIONS

None.

TECHNICAL FIELD

The present disclosure relates to systems and methods for treating pyrolysis oil.

BACKGROUND

As a part of the recycling process, plastics may be converted to products from which useful components may be extracted. One example of such a product is pyrolysis oil. A number of producers produce pyrolysis oils from various waste plastics, including polystyrene, polyethylene, and polypropylene.

Pyrolysis oil contains numerous hydrocarbon components, similar to crude oil. Pyrolysis oil may be further refined, processed, or treated to extract one or more components or streams of interest. In addition to useful components, pyrolysis oil also tends to include contaminants originating from the recycled plastics used as a source. For example, pyrolysis oils may have various contaminants at different concentrations, such as halogens, nitrogen compounds, silicon, metals, sulfur, or heavy hydrocarbons. Such contaminants may make it challenging or impossible to further process pyrolysis oils in refineries, chemical plants, or for blending into fuels, for example, diesel, No. 2 Heavy Oil, Bunker C, or No. 6 Fuel Oil.

A need remains to treat pyrolysis oil to extract fractions or components or interest, and reduce or remove undesirable fractions, components, compounds, or contaminants present in the pyrolysis oil, or convert these to more desirable compounds.

SUMMARY OF THE DISCLOSURE

This summary is provided to introduce various concepts in a simplified form that are further described below in the detailed description. This summary is not intended to identify required or essential features of the claimed subject matter nor is the summary intended to limit the scope of the claimed subject matter.

The present disclosure relates to systems and methods for treating pyrolysis oil. Systems and methods according to the present disclosure may advantageously be used to treat pyrolysis oil in substantially a single unit, for example, a single column. For example, contaminant removal or reduction, and/or removal, reduction, or conversion of undesirable streams or components, and/or simultaneous fractionation of pyrolysis oil in various fractionated streams may be accomplished in a single column.

In aspects, the present disclosure describes a pyrolysis oil fractionation system for treating a pyrolysis oil feed. The system includes a fractionation column. The fractionating column includes a pyrolysis oil inlet. The fractionating column further includes at least one treatment catalyst bed above the inlet and configured to dehydrohalogenate, decontaminate, and/or hydrogenate the pyrolysis oil feed to form a treated pyrolysis oil feed. The fractionating column further includes a plurality of distillation trays above the inlet and configured to fractionate the treated pyrolysis oil feed into a light fraction, a middle fraction, a heavy fraction, and a bottom fraction. The system further includes a condenser fluidically coupled to the fractionation column and configured to receive the light fraction and produce a condensed gasoline product and a vapor. The system further includes a receiver fluidically coupled to the condenser and configured to collect the gasoline product and the vapor. The system further includes a knockout drum fluidically coupled to the receiver and configured to receive a condensed stream from the vapor and produce a fuel gas product. The system further includes a distillate stripper fluidically coupled to the fractionation column and configured to receive the middle fraction and produce a distillate product.

In aspects, a method for treating a pyrolysis oil feed includes, in a fractionating column, dehydrohalogenating, decontaminating, and/or dehydrating a pyrolysis oil feed in at least one treatment catalyst bed to provide a treated pyrolysis oil feed. The method further includes distilling the treated pyrolysis oil feed into a light fraction, a middle fraction, a heavy fraction, and a bottom fraction. The method further includes condensing the light fraction and producing a condensed gasoline product and a vapor. The method further includes separating a fuel gas product from the vapor. The method further includes stripping the middle fraction to produce a distillate product.

This summary and the following detailed description provide examples and are explanatory only of the disclosure. Accordingly, the foregoing summary and the following detailed description should not be considered to be restrictive. Additional features or variations thereof can be provided in addition to those set forth herein, such as for example, various feature combinations and sub-combinations of these described in the detailed description.

BRIEF DESCRIPTION OF THE DRAWINGS

The following figures form a part of the present disclosure and are included to further demonstrate certain aspects of the present invention. The invention may be better understood by reference to one or more of these figures in combination with the detailed description of the specific embodiments presented herein.

Figure 1A:
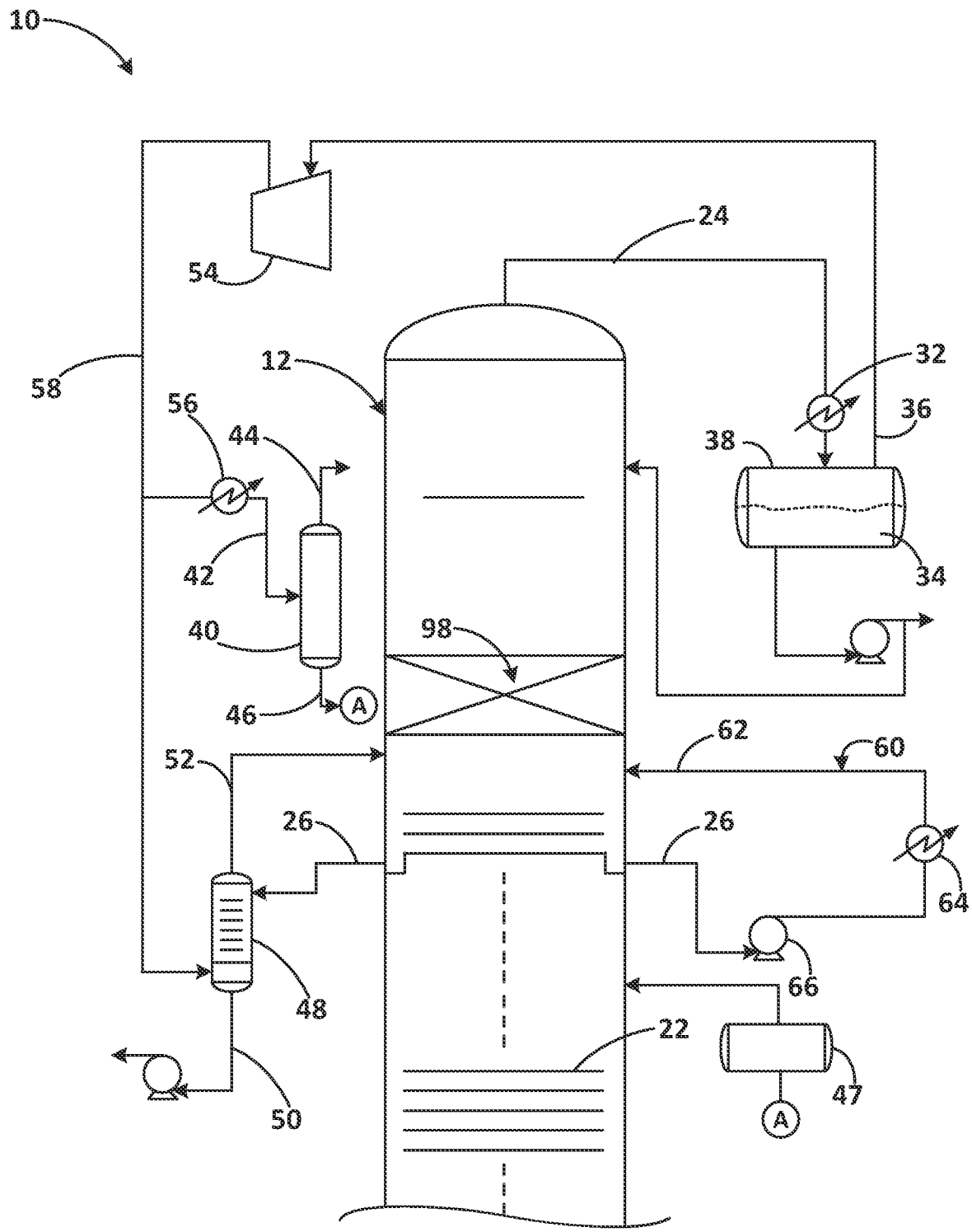
FIG. 1A is a conceptual block diagram showing an upper section of a pyrolysis oil fractionation system for treating a pyrolysis oil feed.

While the inventions disclosed herein are susceptible to various modifications and alternative forms, only a few specific aspects have been shown by way of example in the drawings and are described in detail below. The figures and detailed descriptions of these specific aspects are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

It is to be understood that the disclosure is not limited in its application to the details of construction and the arrangement of components set forth in the following description or illustrated in the drawings.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein or render indefinite or non-enabled any claim to which that definition is applied. To the extent that any definition or usage provided by any document incorporated herein by reference conflicts with the definition or usage provided herein, the definition or usage provided herein controls.

While compositions and techniques are described in terms of "comprising" various components or steps, the compositions and techniques can also "consist essentially of" or "consist of" the various components or steps, unless stated otherwise.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso.

Values or ranges may be expressed herein as "about," for example, from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, ±3% of the stated value, or ±1% of the stated value.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any individual substituents, analogs, compounds, ligands, structures, or groups thereof, or any members of a claimed group, if for any reason Applicant chooses to claim less than the full measure of the disclosure, for example, to account for a reference that Applicant may be unaware of at the time of the filing of the application.

Although any techniques and materials similar or equivalent to those described herein can be used in the practice or testing of the invention, the typical techniques and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

The present disclosure relates to systems and methods for treating pyrolysis oil. Pyrolysis oil may be treated to remove contaminants. For example, inorganic and organic halogen components may be converted to acid gas and removed from fuel gas product, for example, with caustic scrubbing or caustic catalyst bed. Other contaminants such as metals, alloys, or silicon may be removed by deposition on the catalyst itself. Pyrolysis oil may also be fractionated into various streams. For example, pyrolysis oil product may be fractionated into five or more product streams including a fuel gas stream, gasoline product (70° F. to 450° F.), distillate fraction (450° F. to 675° F.), heavy fraction (675° F. to 1200° F.), and heavy oil and solids product (sometimes referred to as "char"). Systems and methods according to the disclosure provide for such and similar treatment of pyrolysis oil in in a single fractionation column.

In aspects, the present disclosure describes a pyrolysis oil fractionation system for treating a pyrolysis oil feed. The system includes a fractionation column. The fractionating column includes a pyrolysis oil inlet. The fractionating column further includes at least one treatment catalyst bed above the inlet and configured to dehydrohalogenate, decontaminate (for example, remove metals, alloys, or silicon), and/or hydrogenate the pyrolysis oil feed to form a treated pyrolysis oil feed. The fractionating column further includes a plurality of distillation trays above the inlet and configured to fractionate the treated pyrolysis oil feed into a light fraction, a middle fraction, a heavy fraction, and a bottom fraction. The system further includes a condenser fluidically coupled to the fractionation column and configured to receive the light fraction and produce a condensed product stream having a boiling point range of gasoline and a vapor. The system further includes a receiver fluidically coupled to the condenser and configured to collect the gasoline product and the vapor. The system further includes a knockout drum fluidically coupled to the receiver and configured to receive a condensed stream from the vapor and produce a fuel gas product. The system further includes a distillate stripper fluidically coupled to the fractionation column and configured to receive the middle fraction and produce a middle distillate product.

In aspects, a method for treating a pyrolysis oil feed includes, in a fractionating column, dehydrohalogenating, decontaminating, and/or dehydrating a pyrolysis oil feed in at least one treatment catalyst bed to provide a treated pyrolysis oil feed. The method further includes distilling the treated pyrolysis oil feed into a light fraction, a middle fraction, a heavy fraction, and a bottom fraction. The method further includes condensing the light fraction and producing a condensed gasoline product and a vapor. The method further includes separating a fuel gas product from the vapor. The method further includes stripping the middle fraction to produce a distillate product.

A vapor or liquid pyrolysis oil feed may be introduced in a fractionation column with one or more catalyst beds, for example, (1) to convert diolefins to olefins and olefins to alkanes, and (2) convert organic and inorganic halogen compounds to their respective acid gas for further treatment as part of fuel gas product. The catalyst beds may contain Ni, Co, Mo, Pd, Pt, Ag on alumina or silica catalyst, molecular sieve, or other alumina silica base catalyst The use of a single column to achieve fractionation and decontamination has not been previously shown. A combination of catalyst, molecular sieve, desiccant, or other materials may be used to convert, reduce, or remove the undesirable components and contaminants. Multiple catalyst beds may be used along the column for better performance. The introduction of hydrogen to facilitate treatment may be controlled by temperature differential across the bed and based on the contaminant level in the feed and acceptable limits in product streams. Fuel gas product may be generated by the column and reused as a stripping medium in a distillate stripper used with the column.

Aspects of systems and methods for treating pyrolysis oil according to the present disclosure are described with reference to the figures.

Figure 1B:
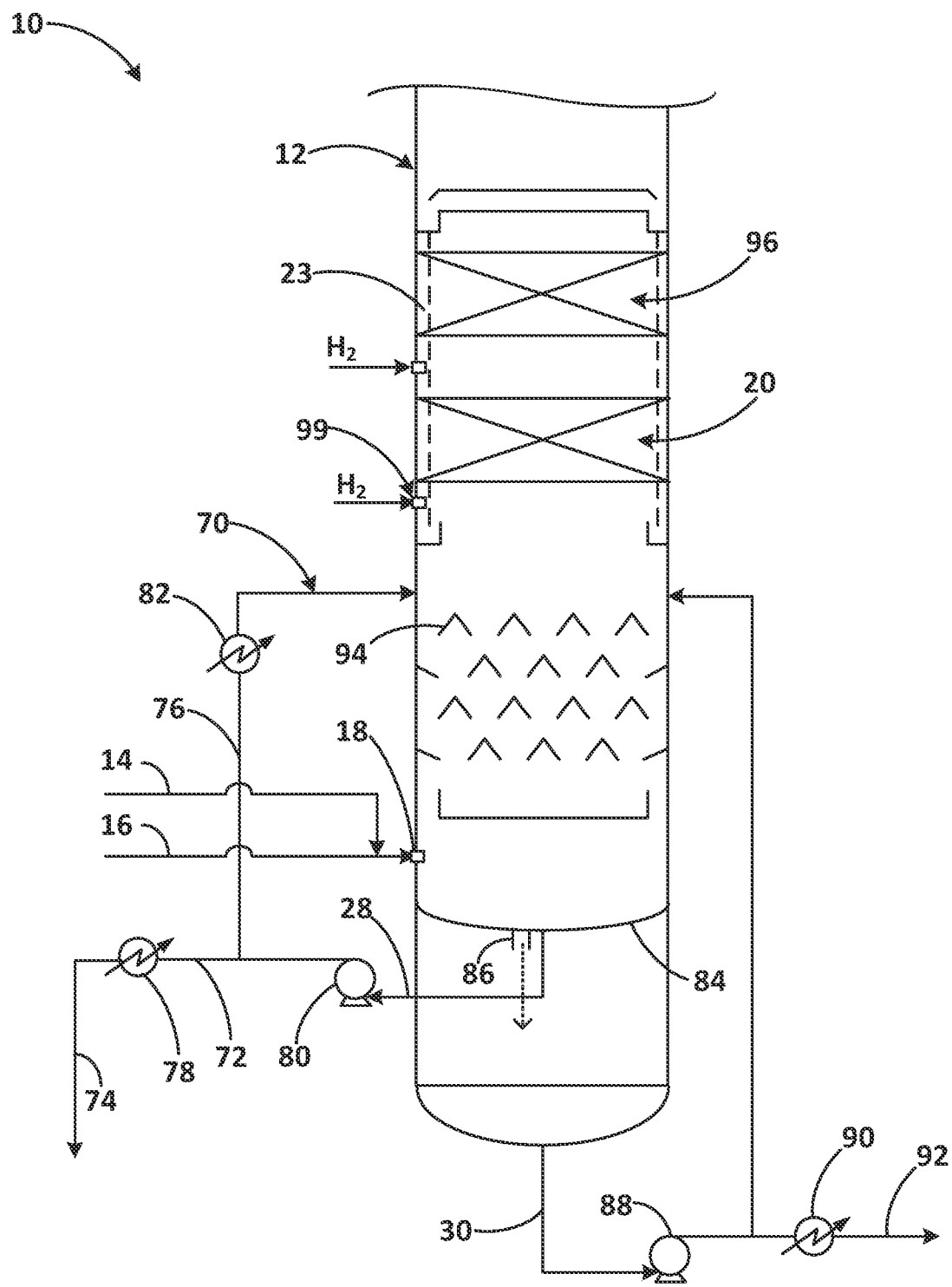
FIG. 1B is a conceptual block diagram showing a lower section of the pyrolysis oil fractionation system of FIG. 1A.

FIG. 1A is a conceptual block diagram showing an upper section of a pyrolysis oil fractionation system 10 for treating a pyrolysis oil feed. FIG. 1B is a conceptual block diagram showing a lower section of the pyrolysis oil fractionation system 10 of FIG. 1A.

The pyrolysis oil fractionation system 10 includes a fractionation column 12 used to treat a pyrolysis oil feed 14. The feed 14 may be introduced into the column 12 in a lower section of the column, for example, as shown in FIG. 1B. The feed 14 may be hydrogenated, for example, with a hydrogen stream 16. For example, the fractionation column 10 includes at least one pyrolysis oil inlet 18. The system 10 may include a single inlet for introducing pyrolysis oil (optionally hydrogenated), or the system 10 may include more than one inlet at different locations along the column. In aspects, the system 10 may include a separate inlet for introducing hydrogen, for example, in close proximity to the inlet for the feed 14, to facilitate hydrogenation of the feed 14.

In aspects, the column 12 includes at least one treatment catalyst bed 20 above the inlet 18. The bed 20 may be configured to dehydrohalogenate, decontaminate, and/or hydrogenate the pyrolysis oil feed 14 to form a treated pyrolysis oil feed.

In aspects, the column 12 includes a plurality of distillation trays 22 above the inlet 18. The distillation trays may be located in one or both of the upper section or the lower section, or in a middle region, of the column 12. In the configuration shown in FIGS. 1A and 1B, some trays 22 are present in the upper section and a middle region, and some trays are present in a lower section. Any suitable number of distillation trays may be used. In aspects, the column 12 includes from 10 to 100 trays, or from 10 to 50 trays, or from 25 to 100 trays, or from 25 to 75 trays, or from 25 to 50 trays.

The trays 22 may be configured to fractionate the treated pyrolysis oil feed into a light fraction 24, a middle fraction 26, a heavy fraction 28, and a bottom fraction 30.

In aspects, the column 12 includes at least one dip tube 23. The dip tube 23 is configured to permit liquid distillate to travel downward along the column 12. For example, the dip tube 23 may transport liquid distillate across or from one or more treatment catalyst beds, thus bypassing fluid flowing down around the at least one treatment bed, and so that substantially only vapor is treated by the at least one treatment bed. The vapor traveling up the column 12 may be treated to dehydrohalogenate, hydrogenate, and/or decontaminate (remove other contaminants such as trace amounts of metals, alloys, or silicon).

The system 10 may include one or more components fluidically coupled to the column 12, for example, to receive one or more of the fractions produced by the column 12. In aspects, one or more such components may refine, treat, remove, or recycle or more streams from or to column 12.

In aspects, the system 10 includes a condenser 32 fluidically coupled to the fractionation column and configured to receive the light fraction and produce a condensed gasoline product 34 and a vapor 36. The system 10 may further include a receiver 38 fluidically coupled to the condenser 32 and configured to collect the gasoline product 34 (for example, a liquid product) and the vapor 36. For example, the receiver 38 may include a tank, or any suitable container or vessel configured to hold one or both of the gasoline product or the vapor 36. The receiver 38 may have a single compartment or may include multiple compartments.

In aspects, the system 10 further includes a knockout drum 40 fluidically coupled to the receiver 38 and configured to receive a condensed stream 42 from the vapor 36 and produce a fuel gas product 44. A residual stream 46 from the knockout drum 40 may be sent to a reflux drum 47, which may send reflux back to the column 12.

In aspects, the system 10 further includes a distillate stripper 48 fluidically coupled to the fractionation column 12 and configured to receive the middle fraction 26 and produce a distillate product 50. The distillate stripper 48 may receive the middle fraction 26 as a liquid draw-off from the plurality of distillation trays 22. The distillate stripper 48 may include one or more trays to distil the middle fraction 26 into the distillate product 50, and a vapor stream 52 may be recycled back to the column 12.

In aspects, the condenser 32 may be a first condenser, and the system 10 may further include a compressor 54 and a second condenser 56 fluidically coupled to the compressor 54. The compressor 54 may be fluidically coupled to the receiver 36 and configured to receive the vapor 36 and produce a compressed vapor 58. The second condenser 56 may be configured to receive the compressed vapor 58 and produce the condensed stream 42. In such aspects, the knockout drum 40 is fluidically coupled to the second condenser 56 to receive the condensed stream 42.

The compressed vapor 58 may also be used for further processing of other streams. For example, in aspects, the distillate stripper 48 is configured to receive the compressed vapor 58 from the compressor 54 and pass the compressed vapor 58 through the middle fraction 26 received in the distillate stripper 48 to strip the middle fraction 26.

In addition to the treatment of the middle fraction 26 by the distillate stripper, the system 10 may further treat a portion of the middle fraction 26. For example, in aspects, the system 10 further includes an intermediate reflux loop 60 configured to receive the middle fraction 26 from the fractionation column 12, cool the middle fraction 26 into a cooled stream 62, and recycle the cooled stream 62 to the fractionation column 12. In such aspects, the intermediate reflux loop 60 may include an intermediate cooler 64 configured to cool the middle fraction, and a pump 66 to cause the cooled stream 62 to be recycled to the fractionation column 12.

It will be appreciated that the system 10 may include an appropriate number and types of pumps, such as pump 66, to operate various recycle loops, or any streams described herein.

The heavy fraction 28 may be retrieved from a lower portion of the column 12, for example, a portion from the bottom of the column 12. In aspects, the system 10 further includes a bottoms reflux loop 70 configured to receive the heavy fraction 28 from the fractionation column 12, cool a first portion 72 of the heavy fraction 28 into a cooled heavy product 74, and cool and recycle a second portion 76 of the heavy fraction 28 to the fractionation column 12. In aspects, the bottoms reflux loop 70 includes a first reflux cooler 78 configured to cool the first portion 72, a pump 80 configured to recycle the second portion 76, and a second reflux cooler 82 configured to further cool the second portion 76.

To facilitate collection and removal of the heavy fraction 28, the fractionating column 12 may include a bottoms head 84 below the plurality of distillation trays 22 configured to receive the heavy fraction 26 at an interior of the column 12. The bottoms head 84 may be a curved tray, for example, concave toward the distillation trays. The bottoms head 84 may include a char drain pipe or tube 86 configured to permit the bottom fraction 30 to flow through the curved bottoms head.

In aspects, the system 10 further includes a bottoms withdrawal pump 88 configured to withdraw the bottom fraction 30 from the fractionation column 12. The system 10 may further include a bottoms cooler 90 fluidically coupled to the bottoms withdrawal pump 88 and configured to cool a portion of the bottom fraction 30 into a char product 92.

To facilitate distributed flow and/or recycling of streams and to facilitate mixing of liquid and gas streams, system 10 may further include a plurality of shed or baffle trays 94 below the plurality of distillation trays 22. In aspects, the plurality of shed or baffle trays 94 includes a staggered arrangement of respective shed or baffle trays.

More than one treatment beds may be used. For example, the at least one treatment catalyst bed may include the first bed 20 below the plurality of distillation trays 22. The first bed may include one or more of a supported Ni, Co, Mo, Pd, Pt, or Ag on alumina or silica catalyst, a molecular sieve, or an alumina silica base catalyst. In aspects, the at least one treatment catalyst bed further includes a second bed 96 between the plurality of distillation trays 22 and the first bed 20. In aspects, the at least one treatment catalyst bed further includes a third bed 98 above the first bed 20. In some such aspects, the third bed 98 may be located between two respective distillation trays of the plurality of distillation trays 22.

In aspects, the fractionation column 12 includes at least one hydrogen inlet. For example, the same inlet 18 used to introduce the pyrolysis oil feed may also be used to introduce hydrogen, or the column 12 may include another inlet. In aspects, the fractionation column may include one or more hydrogen make up inlets 99, for introducing hydrogen to supplement the hydrogen supply along a length of the reactor section.

In aspects, the system 10 includes no more than one fractioning column 12. However, in other aspects, the system 10 may include two or more columns the same as or similar to column 12, with various input and recycle streams being split or distributed across the columns, and the output streams being drawn separately and optionally combined from various columns.

Any suitable method may be used to operate the system 10 to treat pyrolysis oil. The present disclosure describes aspects of a method for treating pyrolysis oil feed. While aspects of the method are described with reference to the system 10 of FIGS. 1A and 1B, any suitable system may be operated according to the method.

Figure 2:
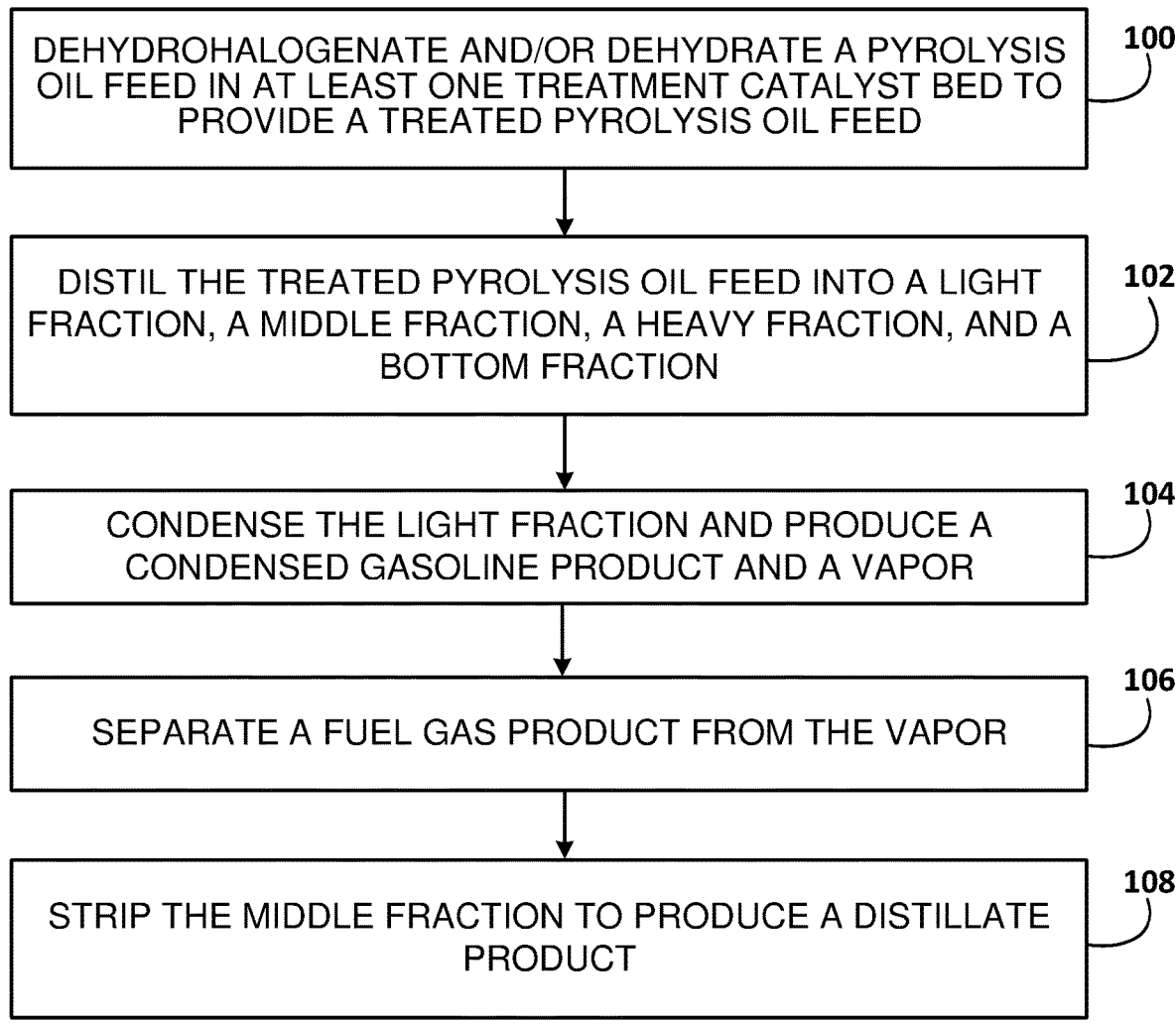
FIG. 2 is a flow chart representing a method for treating pyrolysis oil feed in a fractionation column.

FIG. 2 is a flow chart representing a method for treating pyrolysis oil feed 14 in the fractionation column 12. In aspects, the method includes dehydrohalogenating, decontaminating, and/or dehydrating the pyrolysis oil feed 14 in at least one treatment catalyst bed 20 to provide a treated pyrolysis oil feed (100). The at least one treatment catalyst bed 20 may include one or more of a supported Ni, Co, Mo, Pd, Pt, or Ag on alumina or silica catalyst, a molecular sieve, or an alumina silica base catalyst. The method may further include further including introducing hydrogen into the at least one treatment catalyst bed 20.

The pyrolysis oil may be introduced into the column 12 at a temperature of from about 500° F. to about 1000° F. In aspects, the pyrolysis oil is introduced at a temperature of about 700° F. The pyrolysis oil may be pressurized. In aspects, the pyrolysis oil is at from 2 to 50 psig. In aspects, the method further includes hydrogenating the pyrolysis oil, for example, before introducing the pyrolysis oil into the column 12.

The method may further include distilling the treated pyrolysis oil feed into the light fraction 24, the middle fraction 26, the heavy fraction 28, and the bottom fraction 30 (102). The distilling (102) may include passing or recycling pyrolysis oil feed across the plurality of distillation trays 22.

In aspects, the method further includes condensing the light fraction 24 and producing the condensed gasoline product 34 and the vapor 36 (104). For example, the light fraction 24 may be condensed by condenser 32. In aspects, the gasoline product has a boiling point range from about 70° F. to about 450° F.

In aspects, the method includes separating the fuel gas product 44 from the vapor 36 (106). For example, the vapor 36 may be compressed by the compressor 54 and/or condensed by condenser 56, followed by treatment in the knockout drum 40 to ultimately separate the fuel gas product 44. Thus, the method may further include compressing the vapor 36 by the compressor 54 to produce a compressed vapor 58, and/or condensing the compressed vapor 58 by the condenser 56 to produce the condensed stream 42. The fuel gas product 44 may be extracted from the condensed stream 42 in the knockout drum 40.

In aspects, the method includes stripping the middle fraction 26 to produce the distillate product 50 (108). For example, the distillation 48 stripper may be used to strip the middle fraction 26. In aspects, the distillate product has a boiling point from about 450° F. to about 675° F.

In aspects, the method further includes passing the compressed vapor 58 through the middle fraction 26 in the distillation stripper 48 to strip the middle fraction 26. In aspects, the middle fraction 26 includes a liquid drain-off from the distillation.

In aspects, the method further includes cooling the middle fraction 26 to create the cooled stream 62. The cooled stream 62 may be recycled to the column 12, for example, to the at least one treatment catalyst bed 20, or to a point below the at least one treatment catalyst bed 20. For example, the cooler 64 may be used to cooler the middle fraction 26, and the pump may be used to recycle the cooled stream 62. The cooled stream 62 may be introduced above the bed 20 so that the stream descends through the column to contact the bed 20. For example, instead of or in addition to contacting the bed 20 with the cooled stream 62, the cooled stream 62 may be introduced at another location of the column 12.

In aspects, the method further includes cooling the first portion 72 of the heavy fraction 28 to create the cooled heavy product 74 (for example, using the cooler 78) and cooling and recycling the second portion 76 of the heavy fraction 28 to the column 12. For example, the second portion 76 may be recycled to the at least one treatment catalyst bed 20 (for example, using the cooler 82 and the pump 80). In aspects, the heavy product 74 has a boiling point from about 675° F. to about 1200° F.

In aspects, the method further includes withdrawing and cooling a portion of the bottom fraction 30 to create the char product 92 (for example, using the bottoms cooler 90).

One or more of the light fraction, the middle fraction, the heavy fraction, or the bottom fraction are substantially free of halogen compounds.

Thus, systems and methods according to the present disclosure may be used to decontaminate and fractionate a pyrolysis oil stream in a single column.

ASPECTS

Aspect 1. A pyrolysis oil fractionation system for treating a pyrolysis oil feed, the system including:
 a fractionation column including:
  a pyrolysis oil inlet,
  at least one treatment catalyst bed above the inlet and configured to dehydrohalogenate, decontaminate, and/or hydrogenate the pyrolysis oil feed to form a treated pyrolysis oil feed, and
  a plurality of distillation trays above the inlet and configured to fractionate the treated pyrolysis oil feed into a light fraction, a middle fraction, a heavy fraction, and a bottom fraction;
 a condenser fluidically coupled to the fractionation column and configured to receive the light fraction and produce a condensed gasoline product and a vapor;
 a receiver fluidically coupled to the condenser and configured to collect the gasoline product and the vapor;
 a knockout drum fluidically coupled to the receiver and configured to receive a condensed stream from the vapor and produce a fuel gas product; and
 a distillate stripper fluidically coupled to the fractionation column and configured to receive the middle fraction and produce a distillate product.

Aspect 2. The system of aspect 1, wherein the condenser is a first condenser, the system further including:
 a compressor fluidically coupled to the receiver and configured to receive the vapor and produce a compressed vapor; and
 a second condenser fluidically coupled to the compressor and configured to receive the compressed vapor and produce the condensed stream,
 wherein the knockout drum is fluidically coupled to the second condenser to receive the condensed stream.

Aspect 3. The system of aspect 2, wherein the distillate stripper is configured to receive the compressed vapor from the compressor and pass the compressed vapor through the middle fraction received in the distillate stripper to strip the middle fraction.

Aspect 4. The system of any of aspects 1 to 3, wherein the distillate stripper is configured to receive the middle fraction as a liquid draw-off from the plurality of distillation trays.

Aspect 5. The system of any of aspects 1 to 4, further including an intermediate reflux loop configured to receive the middle fraction from the fractionation column, cool the middle fraction into a cooled stream, and recycle the cooled stream to the fractionation column.

Aspect 6. The system of any of aspects 1 to 4, wherein the intermediate reflux loop includes an intermediate cooler configured to cool the middle fraction, and a pump to recycle the cooled stream to the fractionation column.

Aspect 7. The system of any of aspects 1 to 6, further including a dip tube, wherein the dip tube is configured to permit liquid distillate to travel downward along the fractionation column.

Aspect 8. The system of any of aspects 1 to 7, further including a bottoms reflux loop configured to receive the heavy fraction from the fractionation column, cool a first portion of the heavy fraction into a cooled heavy product, and cool and recycle a second portion of the heavy fraction to the fractionation column.

Aspect 9. The system of aspect 8, wherein the bottoms reflux loop includes a first reflux cooler configured to cool the first portion, a pump configured to recycle the second portion, and a second reflux cooler configured to further cool the second portion.

Aspect 10. The system of any of aspects 1 to 9, wherein the fractionating column includes a curved bottoms head below the plurality of distillation trays configured to receive the heavy fraction, and wherein the curved bottoms head includes a char drain pipe or tube configured to permit the bottom fraction to flow through the curved bottoms head.

Aspect 11. The system of any of aspects 1 to 10, further including a bottoms withdrawal pump configured to withdraw the bottom fraction from the fractionation column.

Aspect 12. The system of aspect 11, further including a bottoms cooler fluidically coupled to the bottoms withdrawal pump and configured to cool a portion of the bottom fraction into a char product.

Aspect 13. The system of any of aspects 1 to 12, further including a plurality of shed or baffle trays below the plurality of distillation trays, wherein the plurality of shed or baffle trays includes a staggered arrangement of respective shed or baffle trays.

Aspect 14. The system of any of aspects 1 to 13, wherein the at least one treatment catalyst bed includes a first bed below the plurality of distillation trays, wherein the first bed includes one or more of a supported Ni, Co, Mo, Pd, Pt, or Ag on alumina or silica catalyst, a molecular sieve, or an alumina silica base catalyst.

Aspect 15. The system of aspect 14, wherein the at least one treatment catalyst bed further includes a second bed between the plurality of distillation trays and the first bed.

Aspect 16. The system of aspects 14 or 15, wherein the at least one treatment catalyst bed further includes a third bed above the first bed.

Aspect 17. The system of aspect 16, wherein the third bed is between two respective distillation trays of the plurality of distillation trays.

Aspect 18. The system of any of aspects 1 to 17, wherein the fractionation column includes at least one hydrogen inlet.

Aspect 19. The system of any of aspects 1 to 18, wherein the plurality of distillation trays includes from 10 trays to 50 trays.

Aspect 20. The system of any of aspects 1 to 18, including no more than one fractioning column.

Aspect 21. A method for treating a pyrolysis oil feed, the method including, in a fractionating column:
 dehydrohalogenating, decontaminating, and/or dehydrating a pyrolysis oil feed in at least one treatment catalyst bed to provide a treated pyrolysis oil feed;
 distilling the treated pyrolysis oil feed into a light fraction, a middle fraction, a heavy fraction, and a bottom fraction;
 condensing the light fraction and producing a condensed gasoline product and a vapor;
 separating a fuel gas product from the vapor; and stripping the middle fraction to produce a distillate product.

Aspect 22. The method of aspect 21, further including:
compressing the vapor to produce a compressed vapor; and
condensing the compressed vapor to produce the condensed stream.

Aspect 23. The method of aspect 22, further comprising passing the compressed vapor through the middle fraction in a distillation stripper to strip the middle fraction.

Aspect 24. The method of any of aspects 21 to 23, wherein the middle fraction includes a liquid drain-off from the distillation.

Aspect 25. The method of any of aspects 21 to 24, further including cooling the middle fraction into a cooled stream and recycling the cooled stream to at least one the treatment catalyst bed.

Aspect 26. The method of any of aspects 21 to 25, further including cooling the middle fraction into a cooled stream and recycling the cooled stream to the fractionation column.

Aspect 27. The method of any of aspects 21 to 26, further including condensing a first portion of the heavy fraction into a cooled heavy product and condensing and recycling a second portion of the heavy fraction to the column.

Aspect 28. The method of aspect 11, further including withdrawing and cooling a portion of the bottom fraction into a char product.

Aspect 29. The method of any of aspects 21 to 28, wherein the at least one treatment catalyst bed includes one or more of a supported Ni, Co, Mo, Pd, Pt, or Ag on alumina or silica catalyst, a molecular sieve, or an alumina silica base catalyst.

Aspect 30. The method of aspect 29, wherein the at least one treatment catalyst bed further includes a second bed.

Aspect 31. The method of aspect 30, wherein the at least one treatment catalyst bed further includes a third bed.

Aspect 32. The method of any of aspects 21 to 31, further including introducing hydrogen into the at least one treatment catalyst bed.

Aspect 33. The method of any of aspects 21 to 32, including introducing the pyrolysis oil at a temperature of from about 500° F. to about 1000° F.

Aspect 34. The method of aspect 33, including introducing the pyrolysis oil at a temperature of about 700° F.

Aspect 35. The method of aspects 33 or 34, wherein the pyrolysis oil is at from 2 to 50 psig.

Aspect 36. The method of any of aspects 21 to 35, further including introducing hydrogen in the pyrolysis oil.

Aspect 37. The method of any of aspects 21 to 36, wherein the gasoline product has a boiling point range from about 70° F. to about 450° F.

Aspect 38. The method of any of aspects 21 to 37, wherein the distillate fraction has a boiling point from about 450° F. to about 675° F.

Aspect 39. The method of any of aspects 21 to 38, wherein the heavy fraction has a boiling point from about 675° F. to about 1200° F.

Aspect 40. The method of any of aspects 21 to 39, wherein one or more of the light fraction, the middle fraction, the heavy fraction, or the bottom fraction are substantially free of halogen compounds.

I claim:

1. A pyrolysis oil fractionation system for treating a pyrolysis oil feed, the system including:
   a fractionation column including:
      a pyrolysis oil inlet,
      at least one treatment catalyst bed above the inlet and configured to dehydrohalogenate, decontaminate, and/or hydrogenate the pyrolysis oil feed to form a treated pyrolysis oil feed, and
      a plurality of distillation trays above the inlet and configured to fractionate the treated pyrolysis oil feed into a light fraction, a middle fraction, a heavy fraction, and a bottom fraction;
   a condenser fluidically coupled to the fractionation column and configured to receive the light fraction and produce a condensed gasoline product and a vapor;
   a receiver fluidically coupled to the condenser and configured to collect the gasoline product and the vapor;
   a knockout drum fluidically coupled to the receiver and configured to receive a condensed stream from the vapor and produce a fuel gas product; and
   a distillate stripper fluidically coupled to the fractionation column and configured to receive the middle fraction and produce a distillate product.

2. The system of claim 1, wherein the condenser is a first condenser, the system further including:
   a compressor fluidically coupled to the receiver and configured to receive the vapor and produce a compressed vapor; and
   a second condenser fluidically coupled to the compressor and configured to receive the compressed vapor and produce the condensed stream,
   wherein the knockout drum is fluidically coupled to the second condenser to receive the condensed stream.

3. The system of claim 2, wherein the distillate stripper is configured to receive the compressed vapor from the compressor and pass the compressed vapor through the middle fraction received in the distillate stripper to strip the middle fraction.

4. The system of claim 1, wherein the distillate stripper is configured to receive the middle fraction as a liquid draw-off from the plurality of distillation trays.

5. The system of claim 1, further including an intermediate reflux loop configured to receive the middle fraction from the fractionation column, cool the middle fraction into a cooled stream, and recycle the cooled stream to the fractionation column.

6. The system of claim 1, wherein the intermediate reflux loop includes an intermediate cooler configured to cool the middle fraction, and a pump to recycle the cooled stream to the fractionation column.

7. The system of claim 1, further including a dip tube, wherein the dip tube is configured to permit liquid distillate to travel downward along the fractionation column.

8. The system of claim 1, further including a bottoms reflux loop configured to receive the heavy fraction from the fractionation column, cool a first portion of the heavy fraction into a cooled heavy product, and cool and recycle a second portion of the heavy fraction to the fractionation column.

9. The system of claim 8, wherein the bottoms reflux loop includes a first reflux cooler configured to cool the first portion, a pump configured to recycle the second portion, and a second reflux cooler configured to further cool the second portion.

10. The system of claim 1, wherein the fractionating column includes a curved bottoms head below the plurality of distillation trays configured to receive the heavy fraction, and wherein the curved bottoms head includes a char drain pipe or tube configured to permit the bottom fraction to flow through the curved bottoms head.

11. The system of claim 1, further including a bottoms withdrawal pump configured to withdraw the bottom fraction from the fractionation column.

12. The system of claim 11, further including a bottoms cooler fluidically coupled to the bottoms withdrawal pump and configured to cool a portion of the bottom fraction into a char product.

13. The system of claim 1, further including a plurality of shed or baffle trays below the plurality of distillation trays, wherein the plurality of shed or baffle trays includes a staggered arrangement of respective shed or baffle trays.

14. The system of claim 1, wherein the at least one treatment catalyst bed includes a first bed below the plurality of distillation trays, wherein the first bed includes one or more of a supported Ni, Co, Mo, Pd, Pt, or Ag on alumina or silica catalyst, a molecular sieve, or an alumina silica base catalyst.

15. The system of claim 14, wherein the at least one treatment catalyst bed further includes a second bed between the plurality of distillation trays and the first bed.

16. The system of claim 14, wherein the at least one treatment catalyst bed further includes a third bed above the first bed.

17. The system of claim 16, wherein the third bed is between two respective distillation trays of the plurality of distillation trays.

18. The system of claim 1, wherein the fractionation column includes at least one hydrogen inlet.

19. The system of claim 1, wherein the plurality of distillation trays includes from 10 trays to 50 trays.

20. The system of claim 1, including no more than one fractioning column.

21. A method for treating a pyrolysis oil feed, the method including, in a fractionating column:
dehydrohalogenating, decontaminating, and/or dehydrating a pyrolysis oil feed in at least one treatment catalyst bed to provide a treated pyrolysis oil feed;
distilling the treated pyrolysis oil feed into a light fraction, a middle fraction, a heavy fraction, and a bottom fraction, wherein the middle fraction includes a liquid drain-off from the distillation;
condensing the light fraction and producing a condensed gasoline product and a vapor;
separating a fuel gas product from the vapor; and
stripping the middle fraction to produce a distillate product.

22. The method of claim 21, wherein separating the fuel gas product from the vapor comprises:
compressing the vapor to produce a compressed vapor;
condensing the compressed vapor to produce a condensed stream, and
separating the fuel gas product from the condensed stream.

23. The method of claim 22, further comprising passing the compressed vapor through the middle fraction in a distillation stripper to strip the middle fraction.

24. The method of claim 21, further including cooling the middle fraction into a cooled stream and recycling the cooled stream to at least one the treatment catalyst bed.

25. The method of claim 21, further including cooling the middle fraction into a cooled stream and recycling the cooled stream to the fractionation column.

26. The method of claim 21, further including cooling a first portion of the heavy fraction into a cooled heavy product and cooing cooling and recycling a second portion of the heavy fraction to the fractionation column.

27. The method of claim 26, further including withdrawing and cooling a portion of the bottom fraction into a char product.

28. The method of claim 21, wherein the at least one treatment catalyst bed includes one or more of a supported Ni, Co, Mo, Pd, Pt, or Ag on alumina or silica catalyst, a molecular sieve, or an alumina silica base catalyst.

29. The method of claim 28, wherein the at least one treatment catalyst bed further includes a second bed.

30. The method of claim 29, wherein the at least one treatment catalyst bed further includes a third bed.

31. The method of claim 21, further including introducing hydrogen into the at least one treatment catalyst bed.

32. The method of claim 21, including introducing the pyrolysis oil at a temperature of from about 500° F. to about 1000° F.

33. The method of claim 32, including introducing the pyrolysis oil at a temperature of about 700° F.

34. The method of claim 32, wherein the pyrolysis oil is at from 2 to 50 psig.

35. The method of claim 21, further including introducing hydrogen in the pyrolysis oil.

36. The method of claim 21, wherein the gasoline product has a boiling point range from about 70° F. to about 450° F.

37. The method of claim 21, wherein the distillate fraction has a boiling point from about 450° F. to about 675° F.

38. The method of claim 21, wherein the heavy fraction has a boiling point from about 675° F. to about 1200° F.

39. The method of claim 21, wherein one or more of the light fraction, the middle fraction, the heavy fraction, or the bottom fraction are substantially free of halogen compounds.

* * * * *